United States Patent [19]

Riedel

[11] 4,275,781
[45] Jun. 30, 1981

[54] CLEATED SNOW CHAIN
[75] Inventor: Tilo Riedel, Salzburg, Fed. Rep. of Germany
[73] Assignee: Sesamat Anstalt, Schaan, Liechtenstein
[21] Appl. No.: 952,652
[22] Filed: Oct. 18, 1978
[30] Foreign Application Priority Data
Oct. 19, 1977 [DE] Fed. Rep. of Germany ....... 2747025
[51] Int. Cl.³ .......................................... B60C 27/00
[52] U.S. Cl. .................................. 152/224; 152/223
[58] Field of Search ............... 152/223, 224, 222, 221, 152/218, 219, 217

[56] References Cited
U.S. PATENT DOCUMENTS

| 1,815,278 | 7/1931 | Strack et al. ......................... 152/223 |
| 1,922,106 | 8/1933 | McKay et al. ................. 152/223 UX |
| 1,952,944 | 3/1934 | Ruffertshofer ...................... 152/223 |
| 1,953,495 | 4/1934 | Nargi ..................................... 152/222 |
| 2,183,321 | 12/1939 | Jackson ............................... 152/222 |

FOREIGN PATENT DOCUMENTS

| 766085 | 8/1967 | Canada ..................................... 152/223 |
| 483991 | of 1917 | France ..................................... 152/223 |
| 1006402 | 4/1952 | France ..................................... 152/223 |

Primary Examiner—John T. Goolkasian
Assistant Examiner—Thomas Bokan
Attorney, Agent, or Firm—Michael J. Striker

[57] ABSTRACT

A cleated chain wrapping is disclosed for use on mounted automotive wheels. The wrapping utilizes a plurality of chain pairs attached to the wheel and extending transversely across the tread surface. Cleats connect one chain in each pair to an adjacent chain in an adjacent pair.

4 Claims, 4 Drawing Figures

CLEATED SNOW CHAIN

BACKGROUND OF THE INVENTION

The invention relates to a snow chain (a non-skid tire chain) for vehicle tires, the said chain having at least one retainer arranged on each side of the tread, and extending wholly or partly in the direction of the tire periphery, for chain links located over the tire tread and for the resilient or non-resilient tensioning and locking devices associated therewith.

SUMMARY OF THE INVENTION

It is the purpose of the invention to provide an inexpensive, largely slip-free snow chain which runs quietly and shows little wear, and which may also be made from an existing metal snow chain.

This purpose is achieved in that the tread area is provided with at least one plastic and/or rubber and/or metal section, either partly or wholly.

When mention is made hereinafter of a plastic and/or a rubber and/or a metal section, this is not intended to mean that the invention is restricted to a plastic and/or a rubber and/or a metal section, but that the said invention relates to a plurality of plastic and/or rubber and/or metal sections, or to a plurality of parts of plastic sections.

Thus the basic concept upon which the invention is based is to be perceived in that at least a part of the tire tread is equipped with a metal chain, which is provided partly or wholly with synthetic plastic material.

This provides considerable advantages. A snow chain of the type according to the invention has a longer life than conventional snow chains. The chain runs extraordinarily quietly, and since even a most inexpensive chain may also be provided with various profiles (whereas, in the case of a tire, this is very costly), the chain may be adjusted initially to the relevant snow conditions. The chain as a whole is dimensionally stable, i.e. it does not twist easily and the plastic sections may also be provided on both sides. Thus when one side becomes worn, the chain can be "rotated", in such a manner that the unworn part, which was on the tire, now faces the road surface. The chain according to the invention has a better grip than conventional chains, and it is also possible to fit "spikes", or the like anti-skid means, in order to prevent the vehicle from slipping sideways or to shorten the braking distance. Further, this chain is less expensive to produce and the sections according to the invention may also be fitted to existing metal snow chains.

BRIEF DESCRIPTION OF THE DRAWINGS

Further details of the invention are described hereinafter, in conjunction with the drawing attached hereto, wherein.

DETAILED DESCRIPTION OF PREFERRED EMBODIMENTS

Figure 1:
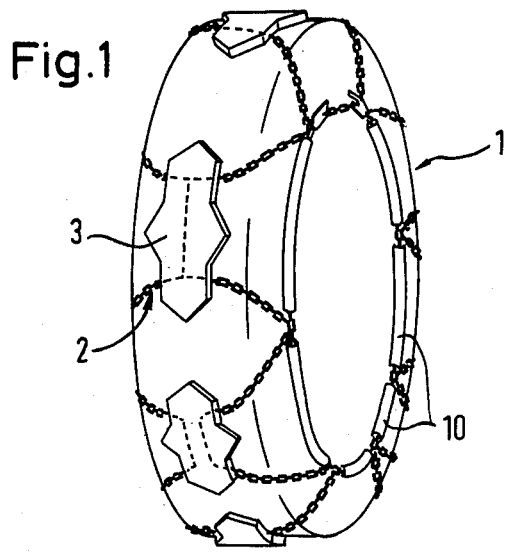
FIG. 1 shows a car tire carrying a snow chain according to the invention.

The snow chain according to FIG. 1 consists of chain links 2 secured on a tire 1 to lateral retainers 10 in known fashion, in this case with spacers 11 interposed. Plastic section 3 may consist of simple cleats, as shown here, with the chain thereunder as shown, but this is not mandatory. Section 3 may also be a connecting element between the individual chains, as shown for example in FIG. 2.

The chain comprises a link 6 and plastic section 3a is the connecting element between the two chains 5.

The section may be of any desired shape designed to have satisfactory non-skid properties.

However, a cavity 4 is visible in the example shown. Reinforcements may be fitted into this cavity, for example a connecting chain between chain-parts 5, or a cable, but also reinforcements which are not connected to chains 5.

It should also be pointed out, and this also pertains to the invention, that the plastic section need not be arranged centrally as shown in FIG. 1; instead similar or other (e.g. narrower) sections may also be arranged laterally. The sections may also be displaced outwardly, leaving the central area free. The design shown in FIG. 3 is similar to that in FIG. 2, except that in this case plastic sections 3b are arranged only at intersections of the chain parts, i.e. chain links 11 are also provided between plastic sections 3b.

Figure 4:
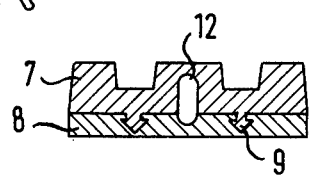
FIG. 4 is a cross section of a plastic profile.

As already explained, the plastic sections may be cast onto and/or into the chain links, i.e. they may be produced integrally. The said plastic sections may also be made in several parts. FIG. 4 shows a two-part plastic section. In this case the tread, part 7 carries pins 9 corresponding with recesses in part 8, the said parts holding together when compressed. Such parts could, of course, also be glued or welded together.

A central orifice 12 is provided, for example, to accommodate a chain. Openings of this kind may also be provided laterally etc.

In the example illustrated, only part 7 of the section is heavily profiled, for the purpose of preventing skidding. Part 8 may be of identical or similar design (with a different profile).

When the term "plastic sections" is used, this also applies, according to the invention, to other suitable mixtures of rubber and/or synthetic materials.

At least one other part, preferably an additional profile, may be associated with the plastic and/or rubber section 3. The profile of this part may differ from that of plastic or rubber section 3, and it may be provided with other anti-skid means, for example "spikes". The said additional part may be placed upon the said plastic or rubber section 3, for example by locking it to the chain links in an easily detachable manner. Retaining means could also be fitted to the plastic/rubber section. For example, the said additional part might comprise teeth, dovetail profiles, studs with hooks, or the like, such locking means engaging in appropriate recesses in plastic/rubber section 3. However, the attachment could also be arranged on the retainer.

However, an additional covering could also be used as the additional profiled part. For example, if the plastic/rubber section 3 carried "spikes", a cap or the like could be fitted in the manner described above.

According to another example of embodiment of the invention, additional profiled parts could also be fitted displaceably, pivotably, or rotatably, either to the chains or to the plastic/rubber sections. For instance "spikes" or other anti-skid means could be associated with this additional profiled part and the spikes could be slid into and out of engagement. To this end, use could be made of known means such as levers, wedges, threads, Bowden cables, cable, chains, links, individually or in combination.

According to the invention, however, it is also possible to design plastic or rubber section 3 itself in such a manner that it can be brought, by at least partial rotation, displacement, pivoting, or the like adjustment, into such a position as to engage or disengage previously fitted "spikes" or the like anti-skid means.

In this connection it should be pointed out that the lateral chains (as shown in FIG. 1, for example) engage to a lesser degree if the plastic/rubber section 3 is higher; if a deeper profile is selected, then the lateral chains dig in more. This function can also be achieved by displacement, rotation, pivoting, etc.

Figure 2:
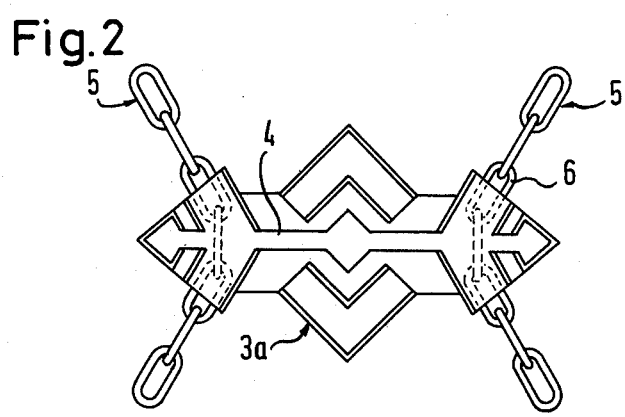
FIG. 2 is a part plan view of a snow chain.
Figure 3:
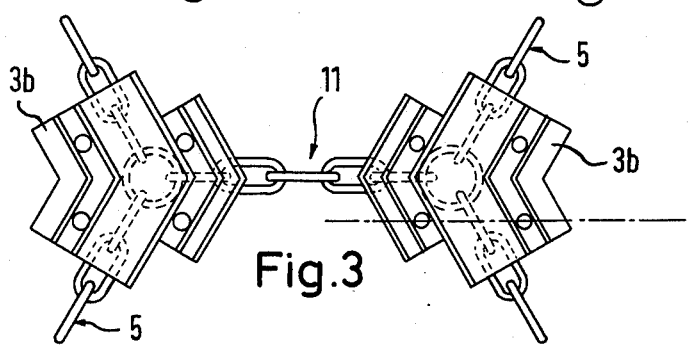
FIG. 3 is also a part plan view of a snow chain.

It should furthermore be pointed out that, with reference to FIG. 2, for example, the section may extend either longitudinally or transversely of the tire (i.e. rotated through 90°), or at any desired angle.

It should also be noted that FIG. 1 shows various arrangement of the chain parts within section 3.

I claim:

1. A cleated chain wrapping for use on automotive tires which have a circumferentially extending tread surface and which are mounted on wheels which have a first side and a second side, comprising: an even plurality of like chain lengths extending transversely across the tread surface from the first side of the wheel to the second side of the wheel, the chain lengths being arranged in a plurality of chain pairs, in a manner that the pairs are spaced around the circumference of the tire in adjacent side-to-side relationship; a plurality of like cleats equal in number to the number of chain pairs, each cleat being located on the tread surface and connected between one of the chain lengths in a chain pair and one of the chain lengths in an adjacent chain pair, said ones being those chain lengths in said chain pairs which are located adjacent each other; and means securing the chain lengths between the first and second sides of the wheel, each cleat being formed of a first part associated with one of said ones and a second part associated with another of said ones, the parts being separate and mirror images of each other, and the parts being secured together by a connecting chain connecting said ones together.

2. The cleated chain wrapping of claim 1, wherein the cleats are made of plastic.

3. The cleated chain wrapping of claim 1, wherein the cleats are made of rubber.

4. The cleated chain wrapping of claim 1, wherein the cleats are made of metal.

* * * * *